(12) United States Patent
Curry

(10) Patent No.: US 11,245,911 B1
(45) Date of Patent: Feb. 8, 2022

(54) VIDEO ENCODER/DECODER (CODEC) FOR REAL-TIME APPLICATIONS AND SIZE/B AND WIDTH REDUCTION

(71) Applicant: Whirlwind 3D, LLC, Beavercreek, OH (US)

(72) Inventor: Damon Curry, Beavercreek, OH (US)

(73) Assignee: Whirlwind 3D, LLC, Beavercreek, OH (US)

( * ) Notice: Subject to any disclaimer, the term of this patent is extended or adjusted under 35 U.S.C. 154(b) by 0 days.

(21) Appl. No.: 17/213,214

(22) Filed: Mar. 26, 2021

Related U.S. Application Data

(60) Provisional application No. 63/023,546, filed on May 12, 2020.

(51) Int. Cl.
| | |
|---|---|
| *H04N 19/186* | (2014.01) |
| *G06F 3/01* | (2006.01) |
| *H04N 19/31* | (2014.01) |
| *G06F 3/147* | (2006.01) |
| *H04N 19/33* | (2014.01) |

(52) U.S. Cl.
CPC ........... *H04N 19/186* (2014.11); *G06F 3/011* (2013.01); *G06F 3/147* (2013.01); *H04N 19/31* (2014.11); *H04N 19/33* (2014.11)

(58) Field of Classification Search
None
See application file for complete search history.

(56) References Cited

U.S. PATENT DOCUMENTS

| | | | |
|---|---|---|---|
| 2007/0253492 A1* | 11/2007 | Shelton | H04N 19/93 375/240.26 |
| 2013/0176489 A1* | 7/2013 | Yamaguchi | G06T 11/001 348/453 |
| 2015/0264348 A1* | 9/2015 | Zou | H04N 19/593 375/240.02 |
| 2017/0200315 A1* | 7/2017 | Lockhart | H04N 13/296 |
| 2018/0189980 A1* | 7/2018 | Wang | H04N 21/2335 |
| 2018/0288363 A1* | 10/2018 | Amengual Galdon | H04N 19/40 |
| 2019/0273910 A1* | 9/2019 | Malaika | G06F 3/147 |
| 2021/0134044 A1* | 5/2021 | Greene | G09G 3/002 |

* cited by examiner

*Primary Examiner* — Talha M Nawaz
(74) *Attorney, Agent, or Firm* — Maxwell L. Minch; Maxwell L Minch Esq. PA

(57) ABSTRACT

The present invention has utility of providing systems and methods for video processing for use in real-time interactive display systems which produce improved video transmission bandwidth with negligible latency thus providing a seamless video feed to enhance real-time interactive displays. The present invention solves the unmet need to optimize video image transmission in real time and after the video source image processing stage, allowing for increased bandwidth for video image processing without losing perceptible image quality or adding perceptible latency. Aspects of the present invention provide systems and methods which analyze pixels of video in real-time and encodes an alternate, reduced bandwidth, data stream for immediate transmission to a receiver where another instance of the codec decodes the received data stream and restores the video's images without introducing perceptible latency.

13 Claims, 3 Drawing Sheets

Exactness for EVEN numbers:

| 8 bits | 7 bits |
|---|---|
| 10101010 | 1010101 0 |
| 11111100 | 1111110 0 |
| 01110110 | 0111011 0 |

Very small (0.39%) difference for ODD numbers:

| 8 bits | 7 bits |
|---|---|
| 10101011 | 1010101 0 |
| 11111101 | 1111110 0 |
| 01110111 | 0111011 0 |

Appended zero

VIDEO ENCODER/DECODER (CODEC) FOR REAL-TIME APPLICATIONS AND SIZE/B AND WIDTH REDUCTION

CROSS-REFERENCE TO RELATED APPLICATIONS

This application claims the benefit of U.S. Provisional application No. 63/023,546, having a filing date of May 12, 2020, the disclosure of which is hereby incorporated by reference in its entirety and all commonly owned.

FIELD OF THE INVENTION

The present invention relates in general to image processing and in particular to systems and methods for real-time video transmission optimization.

BACKGROUND OF THE INVENTION

The most common video format today is 1080P or similar. That format consists basically of 3 video elements representing each pixel of each image within a video stream as 3 numeric values, which are numbers in the range of 0 to 255 for Red, Green and Blue components of each pixel. 1080P refers to 1080 rows of pixels with 1920 pixels in each row. Variations exist and are increasingly common, referred to commercially as "2K", "4K", etc. This basic video format is output by computer graphics cards and used by home televisions and other video devices.

Virtual Reality (VR) systems demand very high visual resolutions, very high frame rates, and imperceptible latency. A minimally acceptable system for VR is generally considered to require at least 1080P (1920*1020) resolution, displayed at 60 frames per second (60 Hz) at a minimum. However, many VR experts demand higher resolutions along with frame rates of 90 Hz or more. For example, a VR-type flight simulator needs higher than 1080P resolution for trainees to be able to read cockpit instruments and other fine-detailed text and images.

Other systems reduce the resolution of images during the image generation process and prior to transmission of the image from source device to target display device in order to reduce the complexity (data content) and associated bandwidth of videos (see patent US 2014/0247277 A1). Visual artifacts result, and such techniques often require additional hardware and software processing to track the user's eye so resolution can be reduced in peripheral vision areas only.

Use of real-time interactive display systems, whether in video gaming, simulation, virtual reality or augmented reality, is a growing trend in the video and video transmission industries. The slightest lag time or buffering of information into such environments can ruin or interrupt the environment, thus making such training ineffective or inducing cyber-sickness feelings of nausea, vertigo, and other negative physiological effects caused by incongruities between vision and other senses. Such real-time interactive display systems demand very high image resolution, and high frame rates to reduce latency to be imperceptible to the viewer. Problems have arisen, however, because the laws of physics plus legal regulations impose hard limits on available bandwidth. Thus simply increasing the energy or bandwidth of the transmission signal cannot be used to meet the industry needs. Thus physical and regulatory restrictions compound the difficulty of producing real-time interactive display systems that provide a seamless real-time interactivity.

Other factors which affect real-time interactive display systems include bulky or uncomfortable equipment, abundance of wires, or the presence of sensors. Thus a major goal in real-time interactive display systems is the minimization of equipment or other environmental factors present outside what would be seen in a real-life scenario.

In order to minimize these external factors, wireless headsets could be used by a user. This, obviously, eliminates cumbersome wires and other items needed to be worn, thus minimizing external factors that could interrupt or detract from the real-time interactive display systems. However, use of such wireless system still demands minimal latency, even with the addition of wireless transmission and receiving equipment into the video signal path which could affect the throughput of producing a video signal for the real-time interactive display.

The most widely used video codec is known as H.264, a non-real-time process which works by analyzing sections of images in multiple video frames for various types of redundancy of pixels and encoding an alternate format containing information about such redundancies. An H.264 codec acting in decoder mode subsequently converts the encoded information into a visual image that closely resembles the original image. However, fine detail in images, known as the high frequency content, is lost or muddled in the H.264 process. In addition, H.264 requires a non-trivial amount of time to process and, as a result, introduces delay (latency) between input and output of H.264 systems. The amount of latency is far beyond the threshold for real-time interactive video such as needed by wearers of a head-mounted display in a virtual reality, mixed reality, or augmented reality application.

Current solutions attempt to improve bandwidth by sacrificing image resolution in some or all areas of each image in a video stream, or encode images via encoder/decoder devices called codecs which introduce latency and are thus not usable for real-time interactive display systems because of the perceptible latency and its ill effects on human users. Some of the current solutions apply to the generation of images, applying algorithms to affect the creation of images in a video stream. As such, those solutions are limited to use in a source device (e.g. inside a computer), ahead ("upstream") of the transmission media and the video receiver(s). Moreover, these current solutions negatively affect the visual quality of the video, causing various visual artifacts such as smearing (loss of high frequency content), frame jitter, and aliasing. Thus there remains an unmet need to optimize video image transmission allowing for increased bandwidth for video image processing without losing perceptible image quality or adding perceptible latency.

SUMMARY OF INVENTION

The present invention has utility of providing systems and methods for video processing for use in real-time interactive display systems which produce improved video transmission bandwidth with negligible latency thus providing a seamless video feed to enhance real-time interactive displays. The present invention does not sacrifice visual resolution by muddying groups of pixels as in H.264. In contrast to non-real-time systems like H.264, the present invention is well-suited for virtual reality and similar real-time video applications. As a result, the present invention provides optimize video image transmission allowing for increased bandwidth for video image processing without losing perceptible image quality or adding perceptible latency. It should be appreciated that the present invention differs from existing solutions, in that previous attempts use dithering techniques instead of truncating the least significant digit of pixel data, which causes reduction in the quality and fine resolution of the finished product.

Aspects of the present invention provide systems and methods which analyze pixels of video in real-time and encodes an alternate, reduced bandwidth, data stream for immediate transmission to a receiver where another instance of the codec decodes the received data stream and restores the video's images without introducing perceptible latency.

Certain aspects of the present invention further provide a codec that can be applied to already-produced video (thus, applied "mid-stream"), making this invention useful to adapt high resolution, high frame rate video for transmission through reduced bandwidth channels such as wireless (radio) links yet still for use on high resolution, high frame rate display devices such as Head Mounted Displays (HMDs) for virtual reality based entertainment or training.

BRIEF DESCRIPTION OF THE DRAWINGS

Examples illustrative of embodiments of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. Many of the figures presented are in the form of schematic illustrations and, as such, certain elements may be drawn greatly simplified or not-to-scale, for illustrative clarity. The figures are not intended to be production drawings. The figures (FIGS.) are listed below.

Figure 1:
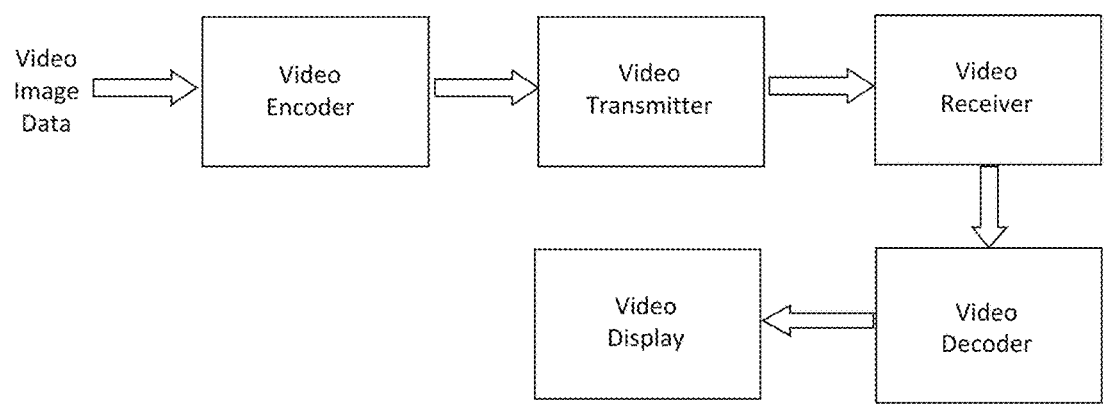
FIG. 1 provides a block diagram of the inventive system for processing video image data.
Figure 2:
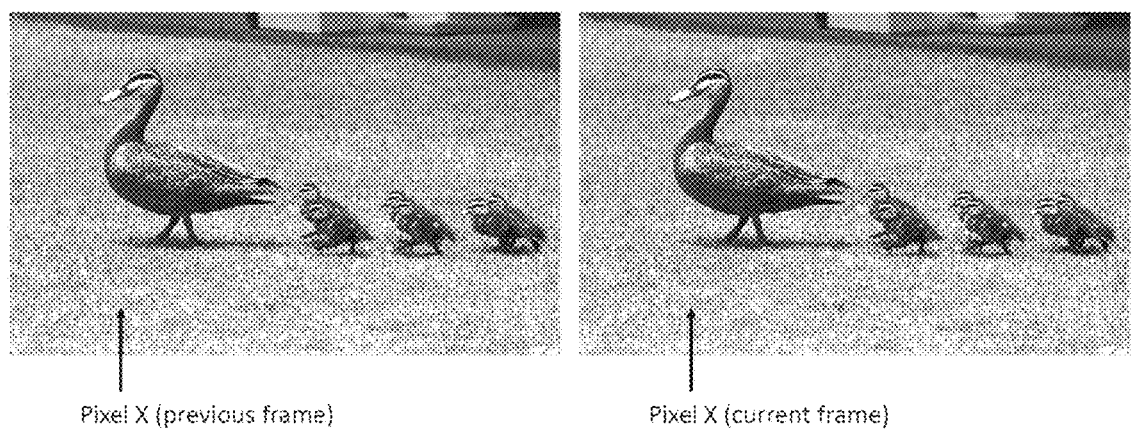
FIG. 2 illustrates the results of the inventive temporal reduction process.
Figure 3:
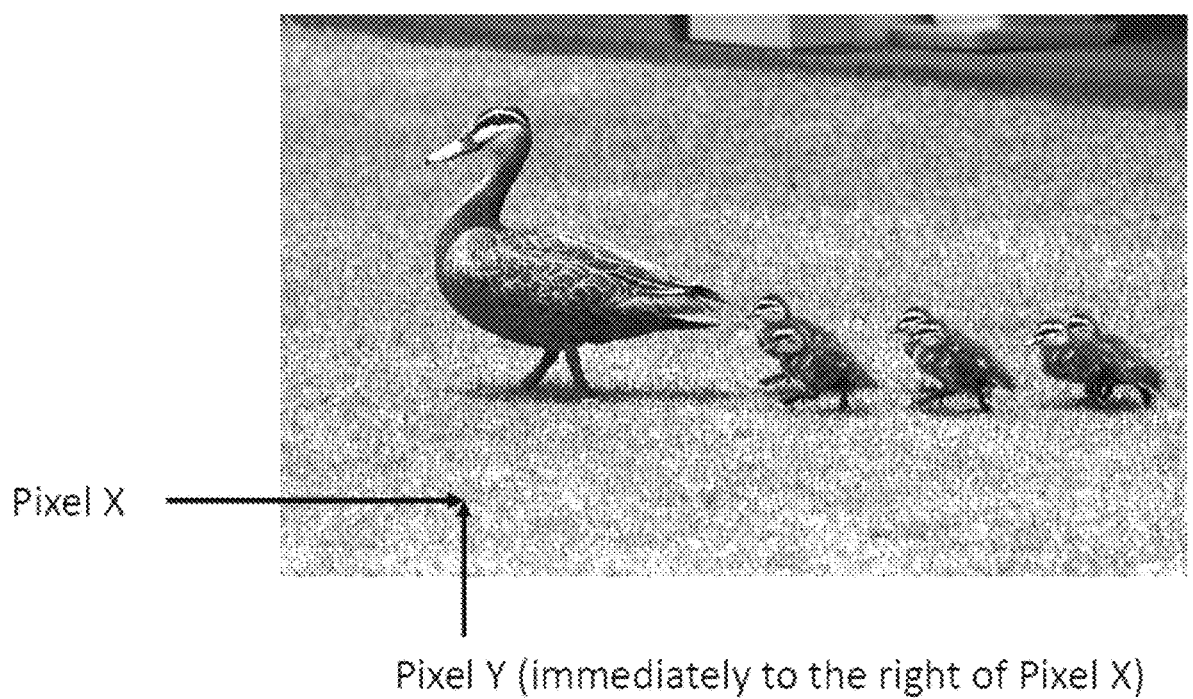
FIG. 3 illustrates the results of the inventive spatial reduction process.
Figure 4:
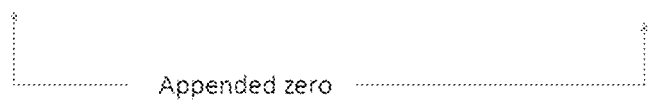
FIG. 4 illustrates the results of the inventive essentially identical color reduction process.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

DETAILED DESCRIPTION OF THE INVENTION

The present invention provides for a video systems and methods designed for use in real-time interactive display systems, including but not limited to systems incorporating virtual reality (VR), mixed reality (MR), or augmented reality (AR), to optimize video image transmission allowing for increased bandwidth for video image processing without losing perceptible image quality or adding perceptible latency.

Embodiments of the present invention provide for systems and methods which analyze in real-time spatial and temporal characteristics of pixels within frames of video along with a special technique of analyzing and manipulating color information. Any one or combination of these separate analyses, combined into a single or plurality of systems or methods, produce an encoded data stream which encodes the source images with significantly fewer bits per frame total than the number of bits per frame in the unmodified source video. As a result, the encoded data stream is transmitted through existing hardware, even with their current physical and regulatory limitations, having less bandwidth, and therefore more data streams are possible to fit through fixed-bandwidth media channels.

Further embodiments of the present invention provide for systems and methods which provide one or more techniques of video processing in real-time, which makes such systems and methods suitable for use in interactive environments and human interactivity such as virtual reality (VR), augmented reality (AR) and gaming.

Further embodiments provide for the decoded video to have the same pixel resolution as the original source video, preserving fine-line detail and other high-frequency content.

Some embodiments provide for systems which incorporate one or more of the methods described herein and include a processor and/or dedicated integrated circuit, such as, for a non-limiting example, a Field Programmable Gate Array (FPGA), for allowing integration with custom systems.

Some embodiments allow for pairs of devices to be inserted into a video stream, at either end of the transport layer, thus one device between the video source and the signal transmitter and another between the signal receiver and the output display screen.

In at least one embodiment, systems and methods may be used along with an unmodified computer to allow transmission through standard Internet wireless routers, enabling wireless virtual reality for home and industrial consumers without causing noticeable visual artifacts or imposing undesirable latency.

The following detailed description is merely exemplary in nature and is in no way intended to limit the scope of the invention, its application, or uses, which may vary. The invention is described with relation to the non-limiting definitions and terminology included herein.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

General

The present invention herein encodes one or more video images in real-time by analyzing several pixels in the current and preceding frame and encoding certain redundancies in real time without reducing the source image's resolution. For a non-limiting example, one method employed is to compare the "current" pixel to the "last received pixel", which visually equates to comparing the pixel currently being analyzed to the pixel received just before it. It should be appreciated that pixels in the current and preceding frame may be a duplicate of the preceding pixel. Redundant pixel information in a current image, or preceding image frame, can be encoded with fewer binary bits on average than it would take to retransmit the full color information of the redundant pixel, thereby encoding the visual information into a form requiring less bandwidth to transmit and store.

The systems and methods described herein provide encoding each pixel of a video frame with information based on the following parameters: Redundancy of color information within a frame (spatial reduction processing based on color); redundancy of color information from frame to frame (temporal reduction processing based on color); and an alternate definition of "same" when determining if two pixels are of the "same" color (Essentially Identical Color (EIC) processing). Embodiments of the invention use one or more, and a combination of the processing techniques. In at least one embodiment, the processing techniques are performed in real-time, causing only negligible latency that is imperceptible to human users.

This invention claims further to include more aggressive application of the color manipulation and image redundancy techniques described above to reduce image/video size even more. This would be useful, for example, to reduce a video with full color content to a video with substantially reduced color content, or reduced resolution (based on user's choices) that would be greatly reduced in size compared to the original. This could be very handy to allow storage of smaller videos, such as output of security or surveillance cameras, in a smaller size with either reduced color variety or even black and white versions of color videos for archival purposes yet captured in real time. While it may be desirable to monitor a machine or factory or wildlife with an off-the-shelf commercial camera that produces full color videos, a reduced color video for archive or follow-on analysis purposes might suffice and also be preferred because of its smaller size (storage requirements).

Spatial Reduction Processing Based on Color

Spatial Reduction Processing Based On Color is implemented by comparing the color components of one pixel within a video frame to other pixels within the same video frame. This technique can be applied simply such as comparing just two pixels in the same frame, or in a more complex way such as comparing three or more pixels in the same frame. The information resulting from such analysis of colors of pixels within the same frame is used within the codec's algorithm to encode and subsequently decode the visual image. This is a form of spatial analysis, since it analyzes pixels separated spatially.

In at least one embodiment, the Spatial Reduction Processing Based On Color method includes receiving video image data, comparing video image data for a first pixel location in an image to an adjacent second pixel location in said same image. It should be appreciated that depending on the transmission that an adjacent pixel location in an image may be by row or column, and depending on whether an image is transmitted from top down, bottom up, left to right or right to left, that a first pixel location and a second pixel location may be before, after, above or below a second pixel location within an image. It should further be appreciated that adjacent pixel location is located in a preceding or following row or column of pixel data information of said image data. In at least one embodiment, the Spatial Reduction Processing Based On Color method further includes truncating the video image data for a pixel location of said second pixel location if the pixel value of said first pixel image data is the same as the image data of said adjacent pixel location. In at least one embodiment, the truncated video image data is communicated through wire, or wirelessly, to be received for decoding for use or display.

In at least one embodiment, video image data processed using at least the Spatial Reduction Processing Based On Color method is received and decoded for use or display. In such embodiments, the received video image data is appended for a second pixel location by substituting the image data for a first pixel location in the absence of video image data for the second pixel location.

In at least one embodiment, the Spatial Reduction Processing Based On Color method is implemented continuously across all the video image data in a video stream. In at least one embodiment, the Spatial Reduction Processing Based On Color is implemented in real time. In at least one embodiment, the Spatial Reduction Processing Based On Color method is combined with one or more other processing methods described herein or known in the art.

Temporal Reduction Processing Based on Color

Temporal Reduction Processing Based On Color is implemented by comparing the color components of one pixel within a video frame to other pixels in a previous video frame. This technique can be applied simply such as comparing a pixel in the current frame to a pixel in a previously received frame, or in a more complex way such as comparing one or multiple pixels in the current frame to one or multiple pixels in a previously received frame. The information resulting from such analysis of colors of pixels in different frames is used within the codec's algorithm to encode and subsequently decode the visual image. This is a form of temporal analysis, since it analyzes pixels separated in time.

In at least one embodiment, a method of processing video image data using Temporal Reduction Processing Based On Color is provided. The Temporal Reduction Processing Based On Color method includes receiving video data. In such embodiments, color information for a pixel location between a first image and a second image in the video data is compared to the same pixel location in the previous frame. Redundant video data is removed from the video data prior to communication, thus reducing the number of bits communicated for video image data. Embodiments include a decoder which appends the video image data for a pixel location by adding video image data to a second image pixel location from a first image pixel location where pixel information is missing from the received image data.

In at least one embodiment, said temporal reduction processing includes receiving video image data and comparing video image data for a pixel location between a first image and second image in said video image data. In some embodiments, the compared images are adjacent, but it is appreciated that where pixel values for a particular location are the same among several images, successive or otherwise, that pixel values among images which are not adjacent may be compared. In at least one embodiment, the video image data for a pixel location of a second image is truncated if the pixel value of the first image pixel location is the same as the pixel value for a second image pixel location. In some embodiments, the truncated video image data is communicated either by wire or wireless transmission.

In at least one embodiment, received truncated video data is decoded. In such embodiments the truncated video image data is received and the video image data for a pixel location of a second image is appended by substituting the image data for a pixel location from a first image pixel location in the absence of video image data for a pixel location in the second image of the received truncated video image data.

In at least one embodiment, the Temporal Reduction Processing Based On Color method is implemented continuously across all the video image data in a video stream. In at least one embodiment, the Temporal Reduction Processing Based On Color is implemented in real time. In at least one embodiment, the Temporal Reduction Processing Based On Color method is combined with one or more other processing methods described herein or known in the art.

Essentially Identical Color (EIC) Processing

Essentially Identical Color (EIC) Processing is implemented to provide an imperceptible change to some color bits within an image data stream. It should be appreciated that computers, televisions, etc. use 24-bit color to represent each pixel, which reduces to 8 bits to represent Red, 8 bits to represent Green, and 8 bits to represent Blue. Accordingly, 8 binary bits produces a range, in decimal numbers, between 0 and 255. Essentially Identical Color (EIC) Processing equates pixels as having the same color components of Red or Green or Blue if the 7 most significant bits are identical and the least significant bit is assumed to be the same (assuming either '1' or '0' makes no difference mathematically or practically).

In embodiments incorporating this processing method the decoding process restores the fixed value '0' (could also be the fixed value '1') in the least significant bit position, thus the received image is built with 8-bit color (8 bits per Red, Green, and Blue), as was the original source image. This process does not change even-numbered colors. Considering each possible color as a number, all even-numbered colors pass through the codec unaltered because the least significant bit is restored to a binary '0' in all cases and for the case of even-numbered colors that action restores the decoded color to the exact same value as the original image pixel's color. This process changes odd-numbered colors very slightly which is imperceptible to most viewers. Odd-numbered colors have a '1' as the least significant bit. This methods' decoding process puts a fixed value '0' in all pixel colors' least significant bit. For example, color 77 in the source image becomes color 76 in the decoded image, a change so small that most people could not discern the difference, noting that the combination of 256 values each of Red, Green and Blue produces a color palette of 16,772,216 separate colors so the distinction from color number 76 to color number 77 is imperceptible to almost all human observers.

Combining the technique of equating colors having the same 7 most significant bits and the technique of restoring to a binary '0' the least significant bit of all 8-bit color values, this codec reduces 24-bit pixels to 21-bit pixels (7-bit Red, 7-bit Green, 7-bit Blue). Applying this technique, without combination with any other technique, would reduce the size of an image or video, and the corresponding bandwidth required to transmit that image or video, by 12.5%. Note that this technique of 8-to-7-to-8 bit color manipulation is but one of three general techniques employed in this invention, so the 12.5% reduction contributes only part of the overall reduction and the total reduction in image size and bandwidth is greater than 12.5%.

In addition, if the just-described color manipulations were the only techniques employed in the codec, then imposed latency would be at most the time to process just one pixel. For example, 24-bits of color information could be processed by a dedicated integrated circuit (e.g. an FPGA device) in the time that it takes to pass just one pixel through the codec. For example, 1080P video at 60 Hz runs at a pixel clock rate of approximately 154 MHz, or 6.5 nanoseconds per pixel. Thus in embodiments where the invention is implemented in an FPGA-based device, which adds an imposed additional latency of just 6.5 nanoseconds, resulting in an imperceptible latency to a user.

In at least one embodiment, a method of processing video image data using Essentially Identical Color (EIC) Processing is provided. The Essentially Identical Color (EIC) processing method includes receiving video data that contains 24-bit color to represent each pixel represented by eight bit (8-bit) video image data representing the Red, Green and Blue pixel values. In such embodiments, the seven most significant bits of video image data for each Red, Green and Blue pixel values is communicated then received. Embodiments include a decoder which appends the video image data for a pixel location by adding a zero to the eighth significant bit prior to display.

In at least one embodiment, Essentially Identical Color (EIC) Processing includes receiving video data that contains 24-bit color to represent each pixel represented by eight bit (8-bit) video image data representing the Red, Green and Blue pixel values, truncating said video image data to remove the least significant bit of each eight bit (8-bit) video image data for a pixel location, and communicating each of the seven most significant bits of video image data for a pixel location. Certain embodiments include decoding the processed video image data by receiving each of the communicated seven most significant bits of video image data for a pixel location, and appending the video image data for a pixel location by adding a zero to the eighth significant bit.

It should be appreciated that the Essentially Identical Color (EIC) Processing may be used in various color systems other than 24-bit systems, including color systems having smaller or larger numbers of bits, such as 32-bit, 48-bit. Accordingly, nothing herein shall be interpreted to limit the invention only to a 24-bit color system.

In at least one embodiment, additional significant bits may be omitted or truncated based on the color system or the application. Accordingly, in at least one embodiment, the least two or more significant bits are omitted or truncated from a video data stream, and appended with a "1", "0" or combinations thereof.

In at least one embodiment, the Essentially Identical Color (EIC) Processing method is implemented continuously across all the video image data in a video stream. In at least one embodiment, the Essentially Identical Color (EIC) Processing is implemented in real time. In at least one embodiment, the Essentially Identical Color (EIC) Processing method is combined with one or more other processing methods described herein or known in the art.

Foveated Display

It is appreciated that data optimization for real-time interactive display systems, such as foveated displays, is included. Certain display types, such as foveated displays, vary image resolution based on the fixation points of an eye's retina. Thus rather than adjusting fixation points to enhance real-time display, one or more, or any combination, of the inventive techniques herein may be implemented to improve foveated displays, and require less down regulation of resolution from a fixation point. Most foveated displays accomplish data optimization and manipulation in the video source device's graphics card before output of the video stream to the display, thus those methods are applicable only inside the video production pipeline and generally do not reduce transmission bandwidth requirements. Accordingly, in at least one embodiment, one or more of the inventive methods are incorporated for foveated displays which provide foveated rendering by manipulating color info in the real time video stream.

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

The foregoing description is illustrative of particular embodiments of the invention, but is not meant to be a limitation upon the practice thereof. The following claims, including all equivalents thereof, are intended to define the scope of the invention.

The invention claimed is:

1. A method of processing video image data, the method comprising:
   (a) receiving video image data;
   (b) processing said video image data using one or more processing techniques of temporal reduction processing based on color, spatial reduction processing based on color, essentially identical color (EIC) processing, or combinations thereof, wherein said temporal reduction processing further comprises:
      receiving said video image data;
      comparing video image data for a pixel location between an adjacent first image and second image in said video image data;
      truncating the video image data for a pixel location of said second image if the pixel value of said first image is the same as said second image; and
      communicating the truncated video image data;
   (c) communicating said processed video image data;
   (d) receiving said processed video image data; and
   (e) decoding said processed video image data.

2. The method of claim 1 wherein said essentially identical color (EIC) processing further comprises:
   receiving said video image data as bits of it component video image data;
   truncating said video image data to remove the least significant bit of said eight bit (8-bit) video image data for a pixel location; and
   communicating the seven most significant bits of video image data for a pixel location.

3. The method of claim 1 wherein said decoding said processed video image data resulting from essentially identical color (EIC) processing further comprises:
   receiving said communicated seven most significant bits of video image data for a pixel location; and
   appending the video image data for a pixel location by adding a zero to the eighth significant bit.

4. The method of claim 1 wherein said decoding said processed video image data resulting from temporal reduction processing further comprises:
   receiving said truncated video image data; and
   appending the video image data for a pixel location of a second image by substituting the image data for a pixel location from a first image in the absence of video image data for a pixel location in the second image of the received truncated video image data.

5. The method of claim 1 wherein said spatial reduction processing further comprises:
   receiving said video image data;
   comparing video image data for a first pixel location in an image to an adjacent second pixel location in said same image wherein said adjacent pixel location is located in a preceding or following row or column of pixel data information of said image data;
   truncating the video image data for a pixel location of said second pixel location if the pixel value of said first pixel image data is the same as the image data of said adjacent pixel location; and
   communicating the truncated video image data.

6. The method of claim 1 wherein said decoding said processed video image data resulting from spatial reduction processing further comprises:
   receiving said truncated video image data; and
   appending the video image data for a pixel location of a second pixel location by substituting the image data for a first pixel location in the absence of video image data for a pixel location in the second pixel location of the received truncated video image data.

7. The method of claim 1, further comprising receiving hexadecimal video image data and processing said video image data into 8-bit video image data for each pixel location.

8. The method of claim 1 wherein said processing and decoding is performed continuously.

9. The method of claim 1 further comprising buffering at least one row of pixel data prior to communication of said pixel data.

10. The method of claim 1 wherein said decoded video image data is displayed on one or more display devices.

11. A method of processing video image data, the method comprising:
   (a) receiving video image data;
   (b) processing said video image data using one or more processing techniques of temporal reduction processing based on color, spatial reduction processing based on color, essentially identical color (EIC) processing, or combinations thereof;
   (c) communicating said processed video image data;
   (d) receiving said processed video image data; and
   (e) decoding said processed video image data, wherein said decoding said processed video image data resulting from temporal reduction processing further comprises:
      receiving said truncated video image data; and
      appending the video image data for a pixel location of a second image by substituting the image data for a pixel location from a first image in the absence of video image data for a pixel location in the second image of the received truncated video image data.

12. A method of processing video image data, the method comprising:
   (a) receiving video image data;
   (b) processing said video image data using one or more processing techniques of temporal reduction processing based on color, spatial reduction processing based on color, essentially identical color (EIC) processing, or combinations thereof, wherein said spatial reduction processing further comprises:
      receiving said video image data;
      comparing video image data for a first pixel location in an image to an adjacent second pixel location in said same image wherein said adjacent pixel location is located in a preceding or following row or column of pixel data information of said image data;
      truncating the video image data for a pixel location of said second pixel location if the pixel value of said first pixel image data is the same as the image data of said adjacent pixel location; and
      communicating the truncated video image data;

(c) communicating said processed video image data;
(d) receiving said processed video image data; and
(e) decoding said processed video image data.

13. A method of processing video image data, the method comprising:
- (a) receiving video image data;
- (b) processing said video image data using one or more processing techniques of temporal reduction processing based on color, spatial reduction processing based on color, essentially identical color (EIC) processing, or combinations thereof;
- (c) communicating said processed video image data;
- (d) receiving said processed video image data; and
- (e) decoding said processed video image data, wherein said decoding said processed video image data resulting from spatial reduction processing further comprises:
  receiving said truncated video image data; and
  appending the video image data for a pixel location of a second pixel location by substituting the image data for a first pixel location in the absence of video image data for a pixel location in the second pixel location of the received truncated video image data.

* * * * *